Aug. 7, 1928.
N. E. KIMBALL
CORD BELT
Filed Dec. 4, 1925
1,679,575
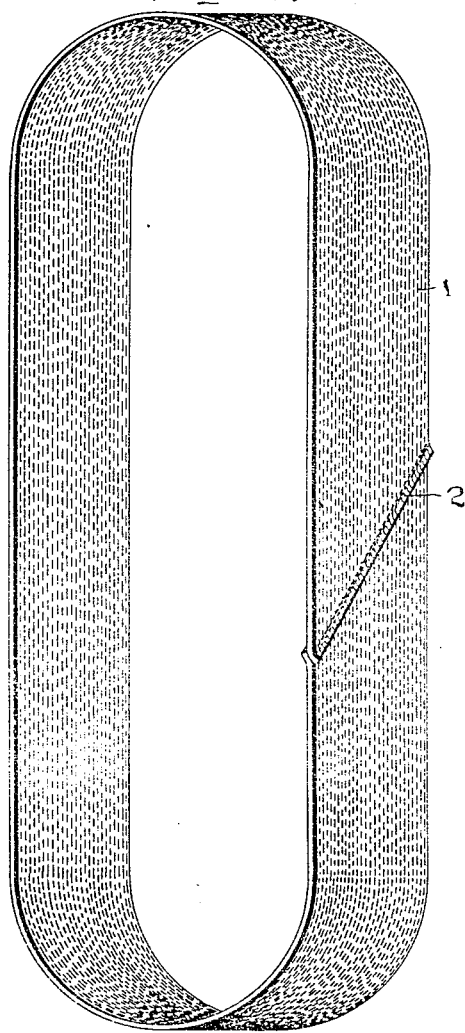
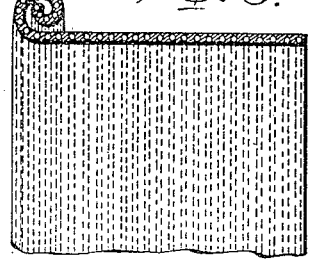
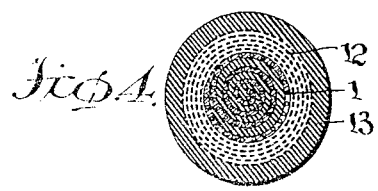
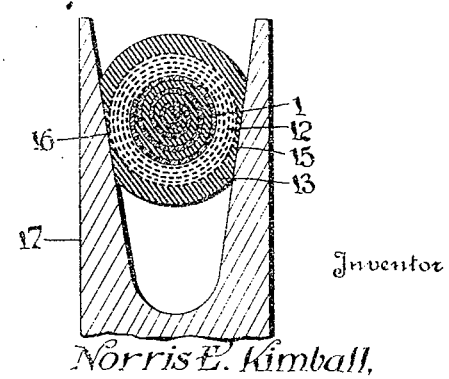
Inventor
Norris E. Kimball,
By Patented Aug. 7, 1928.

1,679,575

UNITED STATES PATENT OFFICE.

NORRIS E. KIMBALL, OF AKRON, OHIO, ASSIGNOR TO THE GOODYEAR TIRE & RUBBER COMPANY, OF AKRON, OHIO, A CORPORATION OF OHIO.

CORD BELT.

Original application filed September 19, 1924, Serial No. 738,603. Divided and this application filed December 4, 1925. Serial No. 73,221.

My invention relates to improvements in endless cord belts and methods of making the same and it particularly pertains to belts that are adapted to be used for the transmission of power to automobile fans and the like.

Heretofore, the manufacture of endless belts of fabric has been proposed wherein a bias-cut band of cross-woven fabric was wound longitudinally upon itself over a cylindrical core member to provide the belt. It has also heretofore been proposed to wind a multiplicity of turns of a rubber impregnated cord upon a mandrel and to encase the core thus formed in a fabric sheath, after which vulcanization is effected to form an endless flat cord belt. The former method of manufacture produces a woven fabric belt of circular cross-section, whereas the latter method produces a flat cord belt.

My invention differs from the above practice in that I propose a method of making a novel cord belt of substantially circular cross-section, in which the cord strands extend longitudinally of the core of the belt. The method is claimed in copending application, Serial Number 738,603, filed September 19, 1924, of which the instant case is a division.

My invention also contemplates an inexpensive cord belt, claimed herein, that, by reason of its form, has the combined advantages of a flat belt and of a belt of circular cross-section.

Fig. 1 of the accompanying drawings is a plan view of a strip of cord fabric that is adapted to be used in the manufacture of a cord center for the belt herein described;

Fig. 2 shows the cord strip illustrated in Fig. 1 wound into a band that is subsequently to be formed into a belt;

Fig. 3 is a lateral sectional view of the band shown in Fig. 2 after the belt has been partially formed;

Fig. 4 is a cross-sectional view of the belt after it is in final assembled condition prior to vulcanization; and Fig. 5 shows the belt after final vulcanization and as used in service in association with a driving pulley.

The strip of cord fabric that is shown in Figs. 1 and 2 may be of any suitable type of rubber impregnated cord fabric that has a series of cord elements 1 extending longitudinally of the fabric. The respective ends of the strip are cut on the bias, as indicated, in order to distribute the line of the splice around the belt. The strip of fabric is first wound into the cylindrical form, shown in Fig. 2, wherein the ends of the cord fabric are slightly overlapped to provide a suitable union wherein the joint extends progressively around the belt, as indicated at 2.

After the band shown in Fig. 2 is formed, it is rolled upon itself, as indicated by the lateral sectional view of Fig. 3, until it forms an endless ring of circular cross-section. A sheath 12 of square-woven fabric that is cut on the bias is then wound on the cord center in accordance with customary practice. A rubber jacket 13 is formed over the fabric sheath 12 to protect the fabric layers of the belt from mechanical injury. The belt is then placed under slight tension in a mold and vulcanized under pressure into the cros-sectional form shown in Fig. 5.

The two angularly disposed faces 15 and 16, that are thus formed on the belt during vulcanization, provide an extensive surface of engagement with the driving face of a V-shaped pulley 17, such as customarily is used for the operation of fan belts for automobiles and the like. This particular cross-sectional shape of the belt gives all of the operating advantages of a flat fan belt, together with the most desirable operating qualities of a belt of round cross-section. The gripping and wear-resisting qualities of the belt are greatly improved by thus flattening the sides of the belt.

The advantages inherent in a belt of this general type are manifold. All of the advantages of the flat cord belt are obtained in a belt of substantially circular section that is much less expensive to manufacture than a cord belt of the flat form that is made, in accordance with customary practice, from a continuous length of cord.

By providing a belt having a substantially circular cross-sectional area, uniform distribution of stresses within the belt has been obtained. By providing plane faces at the sides of the belt, the tractive effect between the belt and the grooves of the pulley has been greatly increased and wear on the belt is uniform over the entire surface of the plane faces. When a round belt is employed, the elements thereof tangent to the grooves of the pulley wear away irregularly, allowing the belt to slide down into the groove, resulting in loosening of the belt and in decreasing the power transmitted. When a belt of trapezoidal shape is utilized there results an undesirable deformation of the central portion of the belt toward the center of the pulley which is entirely overcome by the form of belt herein disclosed.

The particular combination of belt elements, i. e. a core of circular section made up of cord elements surrounded by a body of cross-woven fabric and an outside wear-resisting surface layer of rubber composition molded to a particular form is also a feature of my invention that produces a belt having many superior characteristics.

Although I have described and illustrated only a single preferred form of my invention, it is evident that many modifications of this preferred form may be made without departing from the spirit and scope of my invention. I desire, therefore, that only such limitations shall be imposed upon my invention as are set forth in the accompanying claims.

What I claim is:

1. A belt having a pair of plane pulley engaging faces and convex inner and outer faces.

2. A belt of rubber and fabric comprising a core having a substantially circular cross-section and an envelope of resilient material formed with inner and outer convex surfaces and opposed tapered plane pulley engaging faces.

In witness whereof, I have hereunto signed my name.

NORRIS E. KIMBALL.